US010530622B2

(12) United States Patent
Zarifi et al.

(10) Patent No.: US 10,530,622 B2
(45) Date of Patent: Jan. 7, 2020

(54) METHODS AND APPARATUSES FOR TRANSMITTING AND RECEIVING UPLINK REFERENCE SIGNALS USING NON-ORTHOGONAL SEQUENCES

(71) Applicants: Keyvan Zarifi, Ottawa (CA); Mohammadhadi Baligh, Ottawa (CA); Usa Vilaipornsawai, Nepean (CA)

(72) Inventors: Keyvan Zarifi, Ottawa (CA); Mohammadhadi Baligh, Ottawa (CA); Usa Vilaipornsawai, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/801,177

(22) Filed: Nov. 1, 2017

(65) Prior Publication Data
US 2018/0123850 A1 May 3, 2018

Related U.S. Application Data

(60) Provisional application No. 62/417,221, filed on Nov. 3, 2016.

(51) Int. Cl.
H04W 4/00 (2018.01)
H04L 27/26 (2006.01)
(Continued)

(52) U.S. Cl.
CPC ...... H04L 27/2613 (2013.01); H04J 13/0062 (2013.01); H04L 5/0048 (2013.01);
(Continued)

(58) Field of Classification Search
None
See application file for complete search history.

(56) References Cited

U.S. PATENT DOCUMENTS 9,258,095 B2    2/2016 Zhang et al.
2011/0280203 A1* 11/2011 Han ............... H04L 1/0031
                                                                    370/329
(Continued)

FOREIGN PATENT DOCUMENTS

EP    2306661 A2    4/2011

OTHER PUBLICATIONS

Nokia et al.,"Non-orthogonal coded access (NOCA)", 3GPP TSG-RAN WG1 #86 R1-167249, Gothenburg, Sweden, Aug. 22-26, 2016, total 7 pages.
(Continued)

Primary Examiner — Farah Faroul

(57) ABSTRACT

Methods and devices for configurable sequence usage for user equipment (UE) uplink reference signaling are provided. In one provided method, a transmission reception point (TRP) in a wireless communication network receives a first UL reference signal (RS) associated with a first UL RS sequence from a first UE and receives a second UL RS associated with a second UL RS sequence from a second UE, the first and second UL RS sequences being non-orthogonal. In another provided method, A UE determines an UL RS sequence based on a UL RS sequence root, the UL RS sequence root being a UE-specific root and being independent of a cell identifier of a cell serving the UE. The UE sends an UL RS associated with the UL RS sequence, the UL RS sequence being a Zadoff-Chu sequence.

28 Claims, 5 Drawing Sheets

(51) Int. Cl.
*H04J 13/00* (2011.01)
*H04L 5/00* (2006.01)
*H04W 72/04* (2009.01)

(52) U.S. Cl.
CPC ........ *H04L 5/0007* (2013.01); *H04L 5/0035* (2013.01); *H04W 72/0413* (2013.01); *H04W 72/0466* (2013.01)

(56) References Cited

U.S. PATENT DOCUMENTS

| | | |
|---|---|---|
| 2011/0310828 A1 | 12/2011 | Lin et al. |
| 2013/0044717 A1* | 2/2013 | Wang ............... H04B 7/0613 370/329 |
| 2013/0121186 A1 | 5/2013 | Vajapeyam et al. |
| 2013/0195025 A1* | 8/2013 | Chatterjee ............ H04W 4/70 370/329 |
| 2013/0201913 A1* | 8/2013 | Niemela ............ H04L 25/0226 370/328 |
| 2014/0036737 A1* | 2/2014 | Ekpenyong ........... H04W 8/245 370/280 |
| 2014/0219255 A1* | 8/2014 | Eyuboglu ............. H04W 72/12 370/336 |
| 2014/0247802 A1* | 9/2014 | Wijting ............. H04W 72/0453 370/329 |
| 2016/0037550 A1* | 2/2016 | Barabell ............. H04B 17/318 455/450 |
| 2016/0254869 A1* | 9/2016 | Wen ................. H04L 5/0073 370/330 |
| 2016/0295561 A1* | 10/2016 | Papasakellariou .. H04W 72/042 |
| 2017/0214442 A1* | 7/2017 | Chae ................... H04B 7/0456 |
| 2017/0288834 A1* | 10/2017 | Yuan ..................... H04L 5/0026 |

OTHER PUBLICATIONS

Ericsson,"Uplink reference signals", TSG-RAN WG1 #46bis R1-062856, Seoul, Korea, Oct. 9-13, 2006, total 6 pages.

* cited by examiner

US 10,530,622 B2

METHODS AND APPARATUSES FOR TRANSMITTING AND RECEIVING UPLINK REFERENCE SIGNALS USING NON-ORTHOGONAL SEQUENCES

CROSS-REFERENCE TO RELATED APPLICATION

This application claims the benefit of U.S. Provisional Patent Application No. 62/417,221 entitled "Uplink Reference Signal" filed Nov. 3, 2016, the entire content of which is incorporated herein by reference.

FIELD

The application relates to systems and methods for configurable sequence usage for user equipment uplink reference signaling.

BACKGROUND

In many wireless communication networks, the network conducts uplink channel measurements based on sounding reference signals (SRS) transmitted by a UE. In many cases, each SRS includes a SRS sequence that is based at least in part on the cell identifier (ID) of the cell serving the UE. This limits the number of SRS sequences that are available to be assigned to UEs within the coverage area of a particular cell, and also requires that the UE know the cell-ID of its serving cell.

In future network designs, the identity and location of network transmission reception points (TRPs) may not be known to the user equipment (UEs) served by the network. A specific example is a UE-centric no-cell (UCNC) system in which multiple TRPs may serve a UE without the UE knowing which TRPs are serving it.

Therefore, there exists a need to provide SRS mechanisms to support future network designs.

SUMMARY

According to a first aspect, the present disclosure provides a communication method that includes a transmission reception point (TRP) in a wireless communication network receiving: a first uplink (UL) reference signal (RS) associated with a first UL RS sequence from a first user equipment (UE); and a second UL RS associated with a second UL RS sequence from a second UE, the first and second UL RS sequences being non-orthogonal.

In some embodiments, the first UL RS is located in a first time-frequency location and the second UL RS is located in a second time-frequency location different from the first time-frequency location.

In some embodiments, the first and second UL RS sequences are generated using first and second UL RS sequence roots, respectively, each root being based in part on a number of UL reference signal sequences that have been assigned.

In some embodiments, the first and second UL RS sequence roots are each based in part on a function $f_{UCS}$ according to:

$$f_{UCS} = l \times \left\lfloor \frac{n_{SRS}}{n_{SRS}^{cs,max}} \right\rfloor,$$

where $n_{SRS}$ is the number of UL RS sequences that have been assigned, $n_{SRS}^{cs,max}$ is the maximum number of cyclic shifts permissible for any one UL RS sequence, and l is an integer.

In some embodiments, the first and second UL RS sequences are generated using first and second UL RS sequence roots that are each based in part on a hyper cell identifier (ID) associated with a hyper cell that includes the TRP.

In some embodiments, the first and second UL RS sequence roots are from a pool of UL RS sequence roots that includes more than 60 UL RS sequence roots.

In some embodiments, at least one of the UL reference signals has a sub-carrier spacing (SCS) that is different than the SCS in a time-frequency location used by an uplink data channel.

According to a second aspect, the present disclosure provides a TRP for wireless communication that includes a memory storage that includes instructions, and one or more processors in communication with the memory storage, wherein the one or more processors execute the instructions to implement a method according to the first aspect of the present disclosure.

According to a third aspect, the present disclosure provides a communication method that includes a UE determining an UL RS sequence based on a UL RS sequence root, the UL RS sequence root being a UE-specific root and being independent of a cell identifier of a cell serving the UE. The method may further include the UE sending an UL RS associated with the UL RS sequence. The UL RS sequence may be a Zadoff-Chu sequence, for example.

In some embodiments, the UL RS sequence root is from a pool of UL RS sequence roots that includes more than 60 UL RS sequence roots.

In some embodiments, the UL RS sequence has low cross-correlation with a UL RS sequence for another UE.

In some embodiments, the method further includes sending, by the UE, an UL data signal, the SCS of the UL RS being different from the SCS of the UL data signal.

According to a fourth aspect, the present disclosure provides a UE that includes a memory storage that includes instructions, and one or more processors in communication with the memory storage, wherein the one or more processors execute the instructions to implement a method according to the third aspect of the present disclosure.

DETAILED DESCRIPTION

Figure 1:
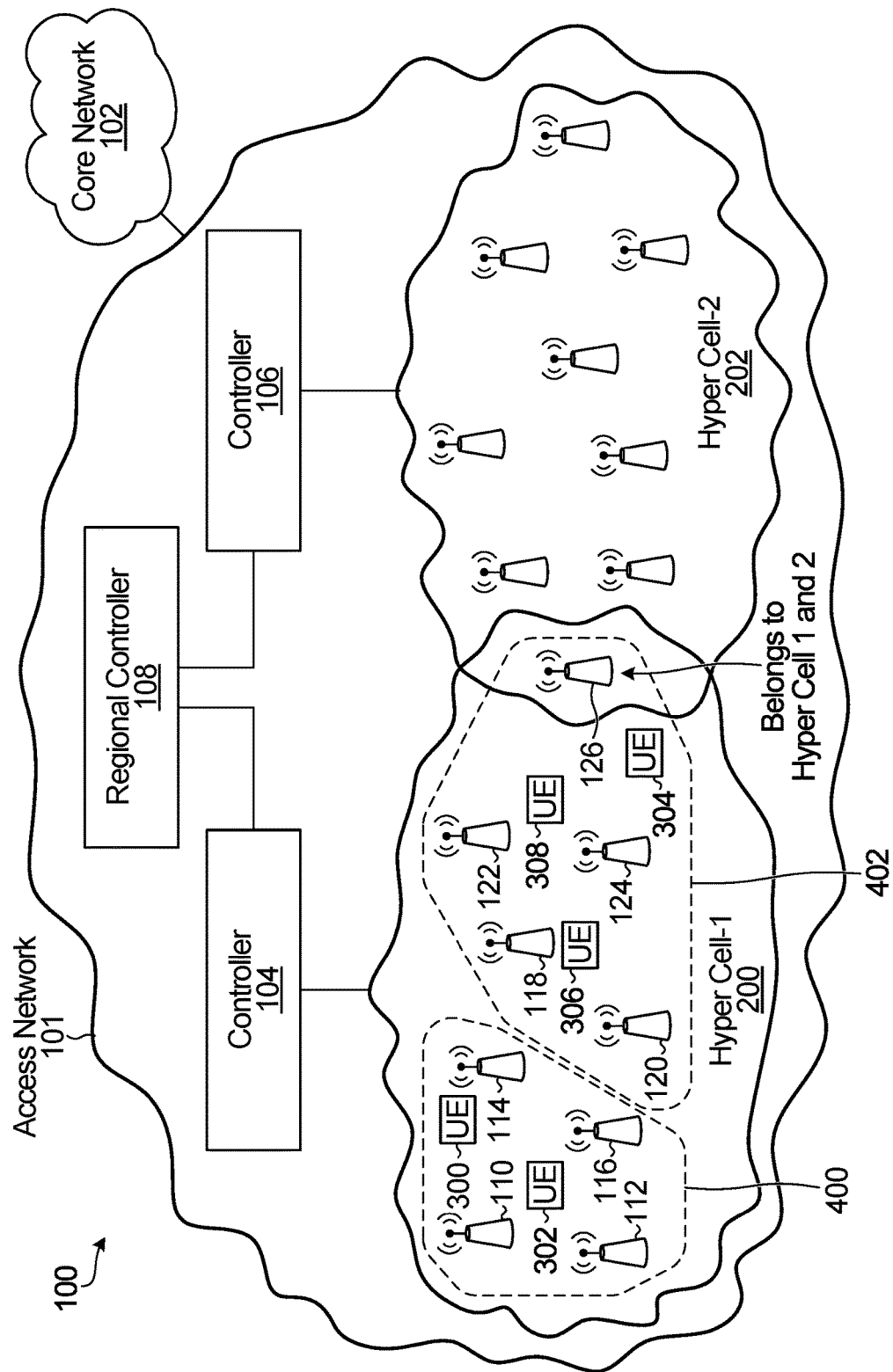
FIG. 1 is a block diagram of a communications network according to an embodiment of the present disclosure.

Generally, embodiments of the present disclosure provide methods and apparatus for sounding reference signal design, transmission and reception. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Before describing embodiments of the present invention with reference to the Figures, a brief description of the use of sounding reference signals in Long Term Evolution (LTE) communication systems is provided to give some context.

SRS in LTE

An uplink (UL) sounding reference signal (SRS) is used in LTE for the purpose of UL channel estimation, i.e. for UL Channel State Information (CSI) and Channel Quality Indicator (CQI) acquisition. The estimated UL channel can be used for the purpose of frequency selective scheduling, for example.

An evolved Node B (eNodeB) can also use SRS for uplink timing estimation as part of a timing alignment procedure. For example, in situations where there are no Physical Uplink Shared Channel (PUSCH) or Physical Uplink Control Channel (PUCCH) transmissions occurring in the uplink for a long time, the eNodeB may rely on SRS for uplink timing estimation.

In LTE, the SRS supports up to 20 MHz of UL bandwidth. The SRS length can be as small as one resource block (RB) and can be as large as 96 RBs, which means that the SRS can be narrowband or wideband. Use of a narrowband SRS has some potential advantages in some usage scenarios. Wideband SRS is more beneficial from a resource utilization point of view, because the UE can sound in the entire bandwidth of interest with a single SRS transmission. However, a cell-edge UE may not have sufficient power to sound over a wide bandwidth in a single transmission, in which case the eNodeB may configure the UE to use frequency hopping for SRS.

In LTE, the sub-carrier spacing (SCS) of SRS is similar to the SCS in the data and control channel and is equal to 15 kHz.

In LTE, the SRS time-frequency (TF) resource mapping is such that SRS can be sent with different periodicities and can be sent in a frequency hopping mode to avoid collisions among SRSs. SRS periodicity can be as small as 2 ms or as large as 320 ms. In some cases, no SRS is transmitted. When SRS is sent, the SRS is sent on the last symbol of a subframe.

In LTE, if SRS is not smaller than 3 RBs, it is generated using Zadoff-Chu (ZC) sequences. If SRS is smaller than 3 RBs, it is generated using phase shift keying (PSK) signal in LTE. A ZC sequence is generated based on a root number. ZC sequences have a number of advantageous properties, such as cyclic shifts of the same ZC sequence being orthogonal to one another, and there being a low cross-correlation between ZC sequences generated using different roots. In particular, the cross-correlation between equal length ZC sequences generated with different roots is proportional to the inverse of the square root of the length of the sequences. In LTE, if SRS is smaller than 6 RBs, 30 different roots are available to generate ZC sequences for SRSs. If SRS is at least 6 RBs, either 30 or 60 different roots are available. In the case of an SRS of at least 6 RBs, the number of available roots is determined by higher layer signaling. In LTE, the root used for the SRS is determined by higher layers through two parameters, namely u: group number which can be any integer in {0, 1, . . . , 29}; and v: base sequence number that can be either 0 or {0,1}.

The root used for SRS is determined through u and v from a pool of 30 (or 60) integers that are not smaller than 1 and not larger than P, where P is the largest prime number that is smaller than the size of SRS.

In LTE, up to 12 cyclic shifts of the same SRS sequence can be used. This means an eNodeB can configure SRS for 12 UEs in the same time and frequency resources but with different cyclic shifts. The cyclic shift multiplexed SRSs need to have the same bandwidth to maintain orthogonality.

In addition, different mappings of the elements of the SRS sequence to subcarriers provides an additional mechanism to allow the same SRS sequence to be used by more than one UE, while still retaining orthogonality between SRSs. In LTE, these mappings are referred to as transmission combs. Transmission comb x means that entries/elements of a SRS sequence are mapped on every x consecutive subcarriers, e.g. every second subcarrier, every third subcarrier, etc. For example, two UEs may be assigned the same SRS sequence, but a first one of the two UEs may have the elements of the SRS sequence mapped to even-numbered subcarriers and the second one of the two UEs may have the elements of the SRS sequence mapped to odd-numbered subcarriers. By doing this, an eNodeB can multiplex two UEs with the same SRS sequence, cyclic shift, frequency and time resources but different transmission comb.

In LTE, two higher layer messages are transmitted by the network to inform UEs how to calculate the SRS ZC root used for UEs in a cell. These two messages are A) group hopping messages and B) sequence hopping messages. These messages include information indicating whether group hopping and sequence hopping are enabled or disabled. If both group hopping and sequence hopping are disabled, all UEs in the same cell use the same root even when their SRSs are mapped to different symbols. If group hopping is disabled and sequence hopping is enabled, all UEs in the same cell use the same root when their SRSs are mapped to the same symbol, but may use two different roots if their SRSs are mapped to different symbols. If group hopping is enabled, all UEs in the same cell use the same root when their SRSs are mapped to the same symbol, but use different roots if their SRSs are mapped to different symbols.

Effectively, this means that all UEs in the same cell having an SRS mapped to the same subframe use the same root. If these SRSs are mapped to the same frequency resource, then the only ways to distinguish them are the use of different transmission combs and the use of use of different cyclic shifts.

In LTE, the SRS ZC roots in two different cells are different, which means that UEs in different cells use different ZC roots.

The following equations govern the SRS design in LTE:

$$\bar{r}_{u,v}(n) = x_q(n \bmod N_{ZC}^{RS}), 0 \leq n < M_{sc}^{RS}$$

$$x_q(m) = e^{-j\frac{\pi q m(m+1)}{N_{ZC}^{RS}}}, 0 \leq m \leq N_{ZC}^{RS} - 1$$

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31$$

$$u = (f_{gh}(n_s) + f_{ss}) \bmod 30$$

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases}$$

-continued $$c(n) = (x_1(n+N_C) + x_2(n+N_C)) \bmod 2 \quad c_{init} = \sum_{i=0}^{30} x_2(i) \cdot 2^i$$

$$x_1(n+31) = (x_1(n+3) + x_1(n)) \bmod 2$$

$$x_2(n+31) =$$
$$(x_2(n+3) + x_2(n+2) + x_2(n+1) + x_2(n)) \bmod 2$$

$$c_{init} = \left\lfloor \frac{n_{ID}^{RS}}{30} \right\rfloor$$

$$f_{ss} = n_{ID}^{RS} \bmod 30$$

$$v = \begin{cases} c(n_s) & \text{if group hopping is disabled and sequence hopping is enabled} \\ 0 & \text{otherwise} \end{cases}$$

$$c_{init} = \left\lfloor \frac{n_{ID}^{RS}}{30} \right\rfloor \cdot 2^5 + ((n_{ID}^{RS} + \Delta_{ss}) \bmod 30) \quad \Delta_{ss} \in \{0, 1, \ldots, 29\}$$

where $\bar{r}_{u,v}(n)$ is the $n^{th}$ element of ZC sequence, $M_{sc}^{RS}+1$ is the maximum number of ZC sequences in LTE, $x_q(m)$ is the ZC equation, q is the ZC root, $N_{ZC}^{RS}$ is the sequence length, u is the group number which can be any integer in {0, 1, . . . , 29}, v is the base sequence number that can be either 0 or {0,1}, and $n_{ID}^{RS}$ is the serving cell ID. C(n) is the PN sequence that is determined by random sequences x_1 (n) and x_2 (n) and $\Delta_{ss}$ is a parameter that is determined by higher layers, $N_C$=1600.

From the foregoing, it can be seen that the ZC sequences $N_{ZC}^{RS}$ used for SRS in LTE are a function of the group number u, the base sequence number v, the length of the sequence $N_{ZC}^{RS}$ and the serving cell ID $n_{ID}^{RS}$.

Problems with SRS Design in LTE

One problem with the SRS design in LTE is that SRS ZC root depends on cell-ID. Even if group hopping and/or sequence hopping are enabled (via higher layer messages Group-hopping-enabled and/or Sequence-hopping-enabled), UEs that belong to the same cell and transmit SRS in the same slot will be assigned the same SRS root. This means that in LTE, either a different transmission comb or a different cyclic shift has to be used to separate the SRSs of the two UEs. However, as discussed, above, the number of different combs and different cyclic shifts is limited in LTE.

Another problem with the SRS design in LTE is that the SRS channel in LTE only supports up to 20 MHz. Future generation networks may require support for larger bandwidths, up to 80 MHz for example.

The support for only one subcarrier spacing in the SRS design in LTE is also potentially problematic for future generation networks, which may utilize multiple SCSs and/or an SCS that is larger or smaller than the 15 kHz SCS used in the current SRS design in LTE. Support for 15, 30, and 60 kHz SCSs may be desirable, for example. However, larger SCS means smaller symbol time and, hence, in general, fewer available cyclic shifts of the same root.

FIG. 1 is a diagram illustrating a communication system in accordance with one embodiment. The communication system 100 includes an access network 101 and a core network 102.

The core network 102 may provide any of various services, such as call control/switching and gateways to other networks. The core network 102 includes network components such as routers, switches, and servers.

The access network 101 is an example of a hyper cell based wireless communication access network, and is connected or coupled to the core network 102. As shown in FIG. 1, the access network 101 includes two hyper cells 200, 202. The access network 101 is an example of a network design similar to that of many proposed future network designs, such as those that have been proposed for the fifth generation (5G) or new radio (NR) wireless networks. Each hyper cell 200, 202 has a respective controller 104, 106 connected to a regional controller 108. Each hyper cell is a logical entity that covers a group of physical transmission reception points (TRPs). A hyper cell may have a configurable coverage area according to network topology, UE distribution and load distribution, for example, and may overlap with a neighboring hyper cell. In the illustrated example, hyper cell 200 has TRPs 110, 112, 114, 116, 118, 120, 124, 126. Hyper cell 202 also has a group of TRPs, including the TRP 126 that also belongs to hyper cell 200. A hyper cell contains many TRPs that may be of different types including, for example, macro cells, pico cells, remote radio heads (RRH), and access points. As an alternate, it is understood that the hyper cell may contain one TRP.

The TRPs provide wireless communication service within respective wireless coverage areas. Each TRP may be implemented using a radio transceiver, one or more antennas, and associated processing circuitry, such as antenna radio frequency (RF) circuitry, analog-to-digital/digital-to-analog converters, etc.

UEs 300, 302, 304, 306, 308 wirelessly access the communication system 100 using the access network 101. Each UE 300-308 includes a radio transmitter and a radio receiver which may be integrated into a radio transceiver, one or more antennas, and associated processing circuitry, such as antenna radio frequency (RF) circuitry, analog-to-digital/digital-to-analog converters, etc. TRPs and the UEs may include similar types of components to support communications with each other in the communication system 100, but the actual implementations may be different. For example, UEs are typically portable between locations, whereas TRPs are typically intended to be installed at a fixed location.

The TRPs may serve as a gateway between wireline and wireless portions of the access network 101, although this need not be the case in embodiments in which the communication links between the TRPs and controllers 104,106 are wireless communications links. The TRPs may be placed at fixed locations by a network provider, for example, to provide a continuous wireless coverage area. This is shown in FIG. 1 in that the coverage areas of hyper cells 200, 202 overlap each other so that UEs 300-308 may move throughout the hyper cells and still be served by the access network 101. A hyper cell identifier (ID) is a logical entity ID that may be assigned to a hyper cell. A UE accesses the network and obtains the hyper cell ID.

In some implementations, multiple TRPs may serve an individual UE as a cooperative multi-point (CoMP) serving set that acts as a virtual TRP (VTRP) for communication with the UE. This is shown in FIG. 1 in that UEs 300 and 302 are served by a CoMP serving set 400 that includes TRPs 110, 112, 114, 116 and UEs 304, 306, 308 are served by a CoMP serving set 402 that includes TRPs 118, 120, 122, 124, 126.

It should be understood that the network of FIG. 1 is a specific example for illustration purposes. This network will be used as a basis for example implementations of the various embodiments described below, but they are not limited to such application.

SRS Design for New Radio (NR)

The present disclosure provides a novel SRS design for applications such as new radio (NR). In some embodiments of the present disclosure, the provided SRS design overcomes, or at least mitigates, one or more of the problems associated with the current SRS design in LTE.

In some embodiments of the present disclosure, SRSs are generated using sequences with low cross-correlation properties. For example, in some embodiments, ZC sequences are used that are similar to those used in LTE. In general, the largest possible root increases with the sequence length, and, similar to LTE, it can be the largest prime number smaller than the sequence length.

In some embodiments, SRSs are configured to support up to 80 MHz bandwidths. This is in contrast to LTE, which as discussed above only supports up to 20 MHz bandwidth for SRS. This means that the maximum SRS length can be much larger than in LTE (for the same subcarrier spacing). For instance, if, similar to LTE, the sub-carrier spacing of 15 kHz is used, the maximum SRS length could be four times larger than in LTE. In embodiments that are based on ZC sequences, larger SRS length can be supported by keeping the maximum length of the ZC sequence equal to the largest prime number that is smaller than the length of SRS.

In some embodiments that are based on ZC sequences, more than 60 roots are available to generate sequences. This is in contrast to the current SRS design in LTE that only allows 30 roots (or 60 roots when group hopping is disabled and sequence hopping is enabled) for the whole network.

A larger number of roots allows more low-correlated sequences to be generated to support a larger number of UEs in dense networks and/or in a hyper cell. As discussed previously, a hyper cell is a NR cell which can cover a large coverage area that includes the coverage areas of many eNBs/TRPs that may be connected through backhaul connections.

The cross-correlation of two ZC sequences with the same length and different roots is inversely proportional to the square root of their length. As such, when more roots are used for a bandwidth less than 20 MHz (shorter SRS lengths), the assigned SRS may be assigned so that UEs that inflict more interference on each other (for instance, nearby UEs) send their SRS in different time frequency (TF) resources or use different cyclic shifts of the same ZC sequence or, if they need to use ZC sequences based on different roots, the roots that are assigned to them may be roots that result in low cross-correlation between the corresponding ZC sequences. This design principle applies to sequences of any length, and is generally more significant for shorter sequences.

In some embodiments, a larger number of roots may only be used for larger bandwidths. For instance, a larger number of roots may only be used for SRS bandwidths that are larger than the 20 MHz bandwidth used for SRS in LTE. For example, for bandwidths between 20 MHz and 40 MHz, the number of roots may be 120, and for bandwidths between 40 MHz and 80 MHz, the number of roots may be 240.

The use of a larger number of roots for larger bandwidths is a practical solution because cross correlation of ZC sequences with two different roots is inversely proportional to the squared root of the ZC length and larger sequences are used in larger BWs.

There are a number of ways to create a larger number of roots.

In some embodiments, a larger number of roots is created by adding more values to u (group number) and/or v (base sequence number). For example, in one embodiment, a larger number of roots may be created by increasing the range of values for u to $\{0, \ldots, 59\}$ for bandwidths between 20 MHz and 40 MHz. An example based on a modified version of the LTE SRS design is provided below.

The following equations govern the SRS design in an embodiment of the present disclosure where a larger number of roots is created using a modified version of the LTE design. The following equations govern the SRS design in this embodiment:

$$\bar{r}_{u,v}(n) = x_q(n \bmod N_{ZC}^{RS}), 0 \leq n < M_{sc}^{RS}$$

$$x_q(m) = e^{-j\frac{\pi qm(m+1)}{N_{ZC}^{RS}}}, 0 \leq m \leq N_{ZC}^{RS} - 1$$

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/(y+1)$$

$$u = (f_{gh}(n_s) + f_{ss} + f_{UCS}) \bmod y$$

$$f_{gh}(n_s) = \begin{cases} 0 & \text{if group hopping is disabled} \\ \left(\sum_{i=0}^{7} c(8n_s + i) \cdot 2^i\right) \bmod y & \text{if group hopping is enabled} \end{cases}$$

$$c(n) = (x_1(n + N_C) + x_2(n + N_C)) \bmod 2 \quad c_{init} = \sum_{i=0}^{y} x_2(i) \cdot 2^i$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

$$c_{init} = \left\lfloor \frac{g}{y} \right\rfloor$$

$$f_{ss} = g \bmod y$$

$$f_{UCS} = l \cdot \left\lfloor \frac{n_{SRS}}{n_{SRS}^{cs,max}} \right\rfloor$$

$$v = \begin{cases} c(n_s) & \text{if group hopping is disabled and sequence hopping is enabled} \\ 0 & \text{otherwise} \end{cases}$$

$$c_{init} = \left\lfloor \frac{g}{y} \right\rfloor \cdot 2^5 + ((g + \Delta_{ss}) \bmod y) \quad \Delta_{ss} \in \{0, 1, \ldots, y-1\}$$

where $\bar{r}_{u,v}(n)$ is the $n^{th}$ element of ZC sequence, $M_{SC}^{RS}+1$ is the maximum number of ZC sequences, $x_q(m)$ is the ZC equation, q is the ZC root, $N_{ZC}^{SR}$ is the sequence length, u is the group number which can be any integer in $\{0, 1, \ldots, y-1\}$, v is the base sequence number that can be either 0 or $\{0,1\}$, y is the maximum number of roots, g is a function of hyper cell ID that satisfies Max(g)>y, $n_{SRS}$ is the number of SRSs that are assigned in the same resources for the UEs that share the same CoMP serving set or are in the same region within a hyper cell, $n_{SRS}^{cs,max}$ is the maximum number of cyclic shifts permissible for any one root, and l is an integer. C(n) is the PN sequence that is determined by random sequences x_1 (n) and x_2 (n), $n_{ID}^{RS}$, is the UE-specific sequence ID and $\Delta_{ss}$ is a parameter that is determined by higher layers, $N_C$=1600, or a larger integer.

In some embodiments, SRS scrambling ID is a UE-specific ID that is used to determine C_init or, equivalently, initialize the pseudo-random sequence C(n) used to generate an SRS sequence using, for instance, the formula provided above or another set of equations.

In some embodiments, the SRS scrambling ID size that is used for deriving the SRS sequence root is larger than the size of the serving cell ID.

In some embodiments the SRS scrambling ID size that is used for deriving the SRS sequence root may be 16 bits.

In one example, the SRS scrambling ID size that is used for deriving the SRS sequence root is the same size as a UE-dedicated ID, such as cellular radio network temporary identifier (C-RNTI).

In another example, SRS scrambling ID is UE-specifically configurable and has no default value.

In another example, SRS scrambling ID is UE-specifically configurable but has a default value. For example, the default value may be at least a function of a UE-dedicated ID such as C-RNTI.

In another example, SRS group hopping is UE-specifically configured and may have a default value. For example, the possible default value for SRS group hopping may be at least a function of a UE-dedicated ID such as C-RNTI.

In another example, SRS sequence hopping is UE-specifically configured and may have a default value. For example, the possible default value for SRS sequence hopping may be at least a function of a UE-dedicated ID such as C-RNTI.

From the foregoing, it can be seen that in this embodiment, the ZC sequences $N_{ZC}^{RS}$ used for SRS are a function of the group number u, the base sequence number v, the length of the sequence $N_{ZC}^{RS}$, but are independent of the serving cell ID nIDRS. Instead, the ZC sequences $N_{ZC}^{RS}$ used for SRS are a function of the hyper cell ID (via the variable g that is a function of the hyper cell ID) and the number of SRSs that are assigned in the same resources for the UEs that share the same CoMP serving set or are in the same region within a hyper cell.

In the foregoing embodiment, the ZC sequence root is determined in higher layers, the maximum available root grows with the sequence length, and the root is determined by u and v. In contrast to the LTE SRS design that was discussed previously, in the foregoing embodiment the number of available roots can be increased by adding more values to u and v (e.g. using a value for y that is greater than 30).

In the example embodiment described above, the additional roots are created by modifying the LTE SRS design equations to add more values to u and v. However, this is merely one specific example of how additional roots can be created.

In other embodiments, a larger number of roots is created using a new design that, unlike the LTE design, removes the dependency of the ZC root to u and v and introduces a new method to calculate ZC root.

In some embodiments, more cyclic shifts of the same root sequence are used to support more UEs. This is possible, for example, in cases where the channel is less dispersive (typically the case in ultra-dense networks (UDN)) and/or when symbols longer than those in LTE are used for SRS. Symbols longer than those in LTE can be used, for example, if the SCS used for SRS is less than 15 kHz. This is possible if either the SCS in NR is less than that of LTE (15 kHz) or the SCS used for SRS is less than 15 kHz but the SCS for other uplink channels remains the same as that of LTE (i.e. different numerology for SRS region). If different numerology (i.e. different SCS) is used for SRS, then a guard band is applied around the SRS region.

In some embodiments, the ZC root for SRS is independent from cell-ID. This is in contrast to the ZC root in SRS for LTE which is cell dependent. In NR, cell ID may not exist and, in some embodiments, SRS is dependent, in part, on hyper cell ID. In some embodiments, other parameters such as UE-ID may be used to generate UE-specific roots.

As a result of the UE being served by multiple TRPs that from a hyper cell, the UE may be within the coverage areas of a large number of TRPs or beams, of which the UE may need to select one or a small number of candidate TRPs/beams to which the UE will send an SRS. This is of particular concern to UEs operating at higher frequencies, because higher-frequency transmissions require beamforming, and the direction of the beam depends on the selection of candidate TRPs by the UE. One option for the UE to select an appropriate beam direction is to sweep through all available beam directions. However, this process incurs a large overhead in terms of time and power consumption. Another option is for the UE to determine candidate directions of serving TRPs based on a downlink signal monitored by the UE, such as a downlink synchronization signal. The UE may already know the direction from which the downlink signals are received based on receive beamforming. As such, the UE can select one or more candidate received signals from the received downlink signals based on a criterion such as received signal strength or SINR, and select the directions of the candidate received signals as the directions of candidate TPs. The UE may then either use those directions as the beamforming directions for its uplink SRS transmissions, or determine one or more beams for uplink SRS transmissions by performing a beamforming sweep only at angles close to the directions of the candidate received signals.

In some embodiments, roots are based on hyper cell ID and different cyclic shifts of the same roots are used for SRSs that are assigned the same TF resources. If the number of assigned SRSs in the same TF resources from the UEs that are in the same hyper cell region or share the same cooperative multi-point (CoMP) serving set exceeds the maximum allowed cyclic shift, a new root and its cyclic shifts are used for the remaining SRSs.

In some embodiments, compared to LTE, more SRSs are available to be used in the same TF resources. This is possible through one or more mechanisms, including increasing the number of cyclic shifts of the same ZC root, using more than one root for generating the ZC sequences that are used in the same TF resources, using larger transmission combs, or a combination of the three.

In some embodiments, SRS supports different SCS spacing than uplink data. This is in contrast to LTE where both data and SRS have 15 kHz SCS. Bundling two or more symbols in the time domain and using lower SCS has the following potential benefits for SRS:

i. To increase the energy per sub-carrier for a given power spectral density (PSD). This may be especially useful for cell-edge UEs as an alternative/combined solution for narrow-band SRS with frequency hopping in LTE, or any other UE that cannot transmit with the power dictated by the network.
  ii. To increase the length of sequence (due to increase of the number of tones in unit bandwidth) and reduce the correlation among different roots. This may be especially useful where more than one root is needed to generate more SRSs to be used in the same TF resources to support more UEs.
  iii. To increase the number of cyclic shift versions of the same root. Required cyclic shift distance is inversely proportional to symbol time, so a longer symbol time means that potentially a larger number of cyclic shifts are possible.

In some embodiments, SRS is configured to work in networks with SCS other than 15 kHz. This is contrast to LTE that only operates in 15 kHz SCS. In a particular embodiment, SRS is configured to support 15 kHz, 30 kHz, and 60 kHz SCS. Larger SCS means smaller symbol time and, hence, in general, less number of possible cyclic shifts of the same root. This makes solutions such as using multiple SRS roots in the same TF resources or bundling multiple symbols (change of numerology in SRS region) more viable in some cases.

In some embodiments, SRS is configured to support more periodicity options than those provided in SRS in LTE. This can include, for example, periodic, aperiodic, and single shot SRS.

In some embodiments, SRS is configured to support more frequency hopping options than those provided in LTE. The used roots in LTE are time (slot) dependent, but the cyclic time shifts are not. In some embodiments of the present disclosure, the cyclic time shifts are also time dependent.

Figure 2:
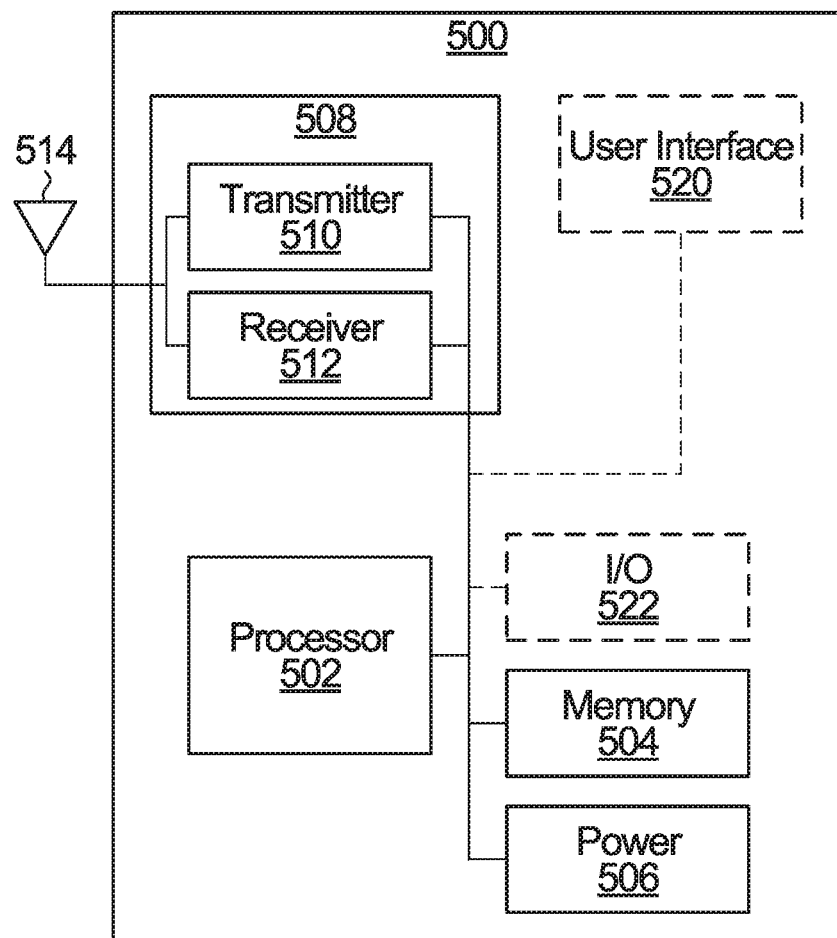
FIG. 2 is a block diagram of a UE according to an embodiment of the present disclosure.

FIG. 2 shows one embodiment of a UE 500 for implementing the methods and modules described herein. The UE 500 may include a processor 502, a memory 504, a power source 506 and a wireless communications interface 508 for sending and receiving data in the communications network 100 shown in FIG. 1, which components may or may not be arranged as shown in FIG. 2. The wireless communications interface 508 includes a transmitter 510 and a receiver 512 coupled to an antenna 514. It will be appreciated that the functions of the wireless communications interface 508 may be carried out by different transceiver or modem components including multiple transmitter, receiver, digital signal processor (DSP) and antenna components or arrays. In one embodiment, the UE 500 includes a user interface 520 and various inputs/outputs (I/O) 522 such as a display, audio input, audio output, keypads, buttons, microphones or other inputs or outputs. The memory 504 may store programming and/or instructions for the processor 502 including instructions for sending, receiving, processing and supporting different services and types of data, such as but not limited to video, VoIP calls, web browsing data, email and other text communications.

Figure 3:
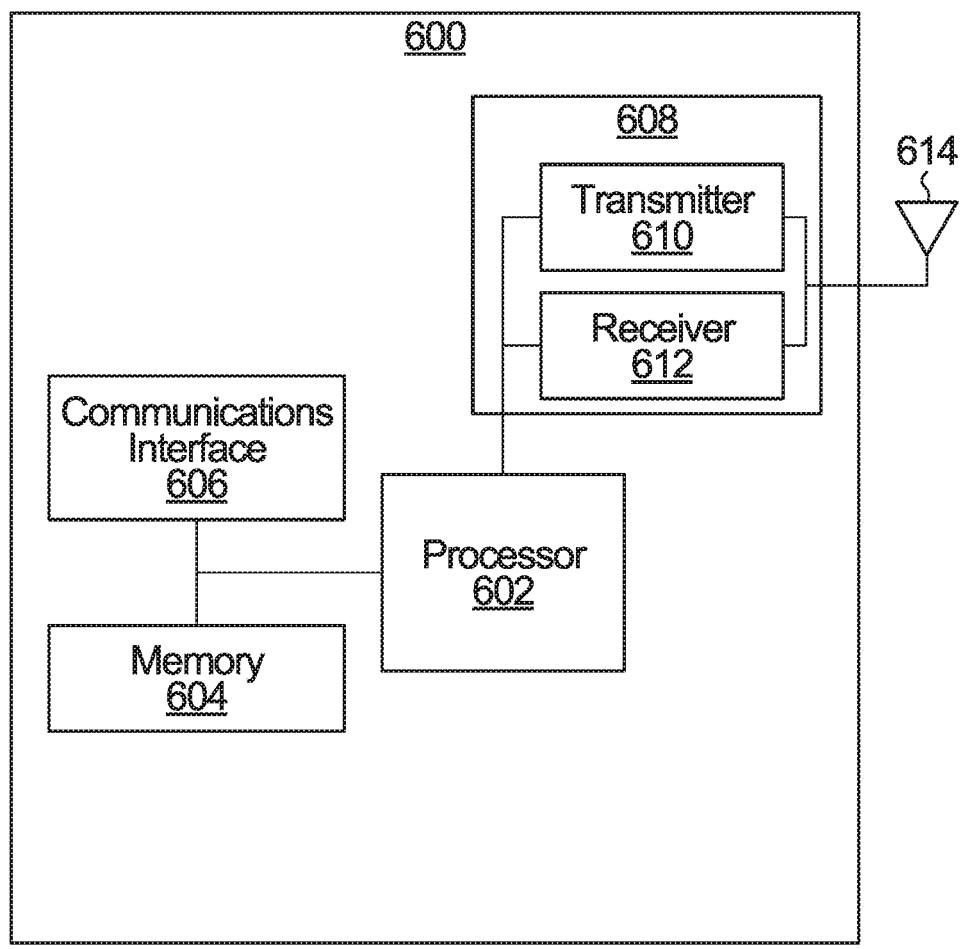
FIG. 3 is a block diagram of a transmission reception point (TRP) in accordance with an embodiment of the present disclosure.

FIG. 3 illustrates a TRP 600 according to an embodiment of the present application. The TRP 600 may comprise a processor 602, a memory 604, one or more communications interfaces 606, 608. The communications interface 606 may be a wired or wireless interface for sending and receiving data to a backhaul network or to other network nodes, gateways or relays in a network, such as the network 100 shown in FIG. 1. The wireless communications interface 608 is configured to send and receive data with one or more UEs, including assigning SRS channels and performing uplink channel measurements based on received SRSs as described herein. The wireless communications interface 608 includes a transmitter 610 and a receiver 612 coupled to an antenna 614. It will be appreciated that the functions of the wireless communications interface 608 may be carried out by different transceiver or modem components including multiple transmitter, receiver and antenna components or arrays. The memory 604 may store programming and/or instructions for the processor 602, including instructions for sending and receiving data to and from a UE.

Figure 4:
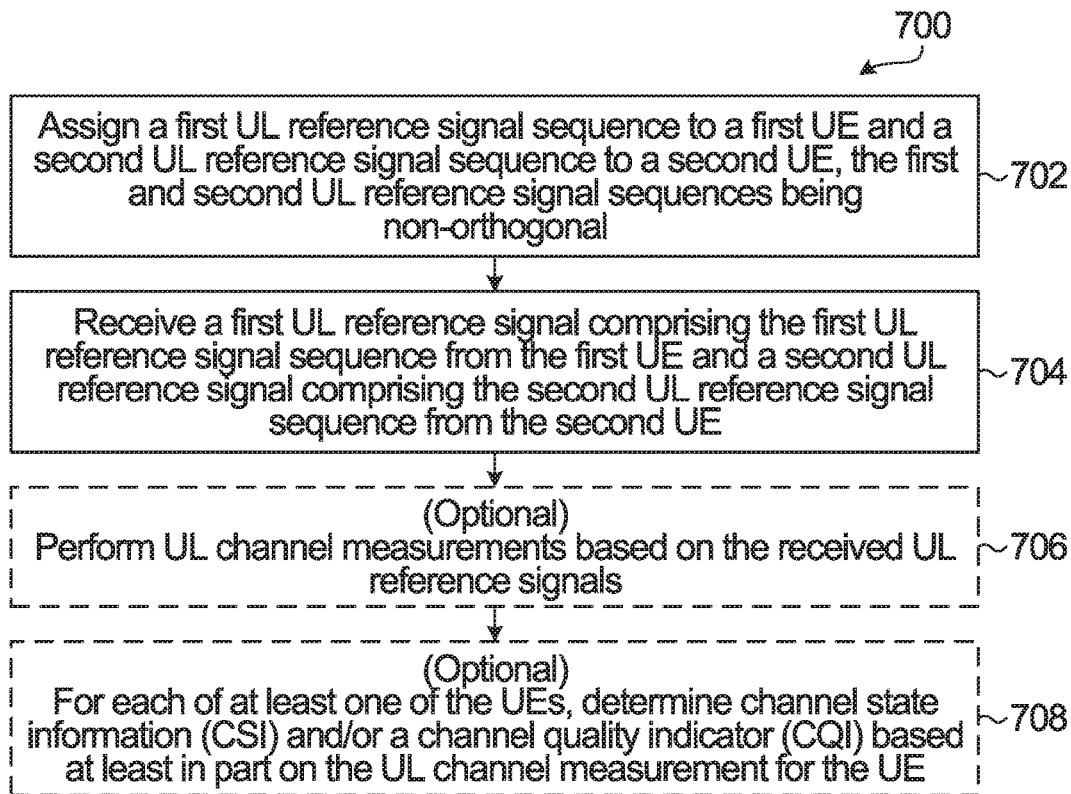
FIG. 4 is a flow diagram of example operations in a TRP according to an embodiment of the present disclosure.

FIG. 4 illustrates a flow diagram of example operations 700 in a TRP according to example embodiments described herein.

In block 702, the TRP assigns a first UL reference signal sequence to a first UE and a second UL reference signal sequence to a second UE, the first and second UL reference signal sequences being non-orthogonal.

In block 704, the TRP receives a first UL reference signal comprising the first UL reference signal sequence from the first UE, and a second UL reference signal comprising the second UL reference signal sequence from the second UE. In some embodiments, the first and second UL reference signal sequences have low cross-correlation. For example, the first and second UL reference signal sequences may be Zadoff-Chu sequences with different roots.

In some embodiments, the first and second UL reference signals are located in the same time-frequency location. In other embodiments, they are located in different time-frequency locations.

In some embodiments, the first and second UL reference signals are generated using first and second UL reference signal sequence roots, respectively, each root being based in part on a number of UL reference signal sequences that have been assigned in the same time-frequency location to UEs in a specific part of a hyper cell, for example, the coverage area of cooperative multipoint (CoMP) set within the hyper cell. For example, each root may be based in part on a ratio of a) the number of UL RS sequences that have been assigned to b) a maximum number of cyclic shifts permissible for any one UL reference signal sequence. In a particular example, the first and second UL RS sequence roots are each based in part on a function $f_{UCS}$ according to:

$$f_{UCS} = l \times \left\lfloor \frac{n_{SRS}}{n_{SRS}^{cs,max}} \right\rfloor,$$

where $n_{SRS}$ is the number of UL RS sequences that have been assigned, $n_{SRS}^{cs,max}$ is the maximum number of cyclic shifts permissible for any one UL RS sequence, and l is an integer, as discussed previously.

In some embodiments, the first and second UL RS sequences are generated using first and second UL RS sequence roots that are each based in part on a hyper cell identifier (ID) associated with a hyper cell that includes the TRP, as discussed previously.

In some embodiments, the operations 700 further include receiving, at the TRP, a third UL reference signal from a third UE, the third UL reference signal comprising a third UL RS sequence that is orthogonal to the first UL reference signal sequence or the second UL reference signal sequence. For example, the third UL reference signal sequence may be a cyclic shift of the first UL reference signal sequence or the second UL reference signal sequence.

Optionally, in block 706, the TRP performs UL channel measurements based on the received UL reference signals.

Optionally, in block 708, the TRP determines, for at least one of the UEs, CSI and/or a CQI based at least in part on the UL channel measurement for the UE.

It is understood that the UL reference signal, for example, may be a SRS.

The example operations 700 are illustrative of an example embodiment. Various ways to perform the illustrated operations, as well as examples of other operations that may be performed, are described herein. Further variations may be or become apparent.

Figure 5:
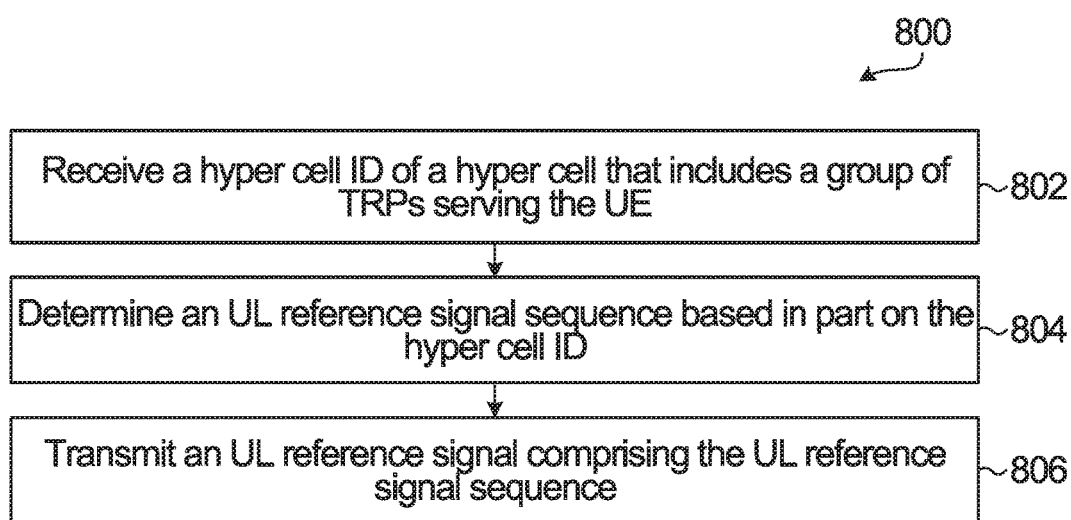
FIG. 5 is a flow diagram of examples operations in a UE in accordance with an embodiment of the present disclosure.

FIG. 5 illustrates a flow diagram of example operations 800 in a UE according to example embodiments described herein.

In block 802, the UE receives a hyper cell identifier (ID) of a hyper cell that includes a group of transmission reception points (TRPs) serving the UE. The hyper cell ID may be received via higher level signaling, for example.

In block 804, the UE determines an uplink (UL) reference signal sequence based in part on the hyper cell ID. For example, the UE may determine an UL reference signal sequence root based in part on the hyper cell ID and derive the UL reference signal sequence based in part on the UL reference signal sequence root. Determining the UL reference signal sequence root may be based in part on a number of UL reference signal sequences that have been assigned, as discussed previously.

In block 806, the UE transmits an UL reference signal comprising the UL reference signal sequence.

In some embodiments, operations 800 further include the UE transmitting an UL data signal on an UL data channel, wherein the UL reference signal has a SCS that is different than the SCS of the uplink data signal. In such cases, the UE may transmit the UL reference signal in a first time frequency location and transmits the UL data signal in a second time frequency location, with a guard band between the first and second time frequency locations.

It is understood that the UL reference signal, for example, may be a SRS.

The example operations 800 are illustrative of an example embodiment. Various ways to perform the illustrated operations, as well as examples of other operations that may be performed, are described herein. Further variations may be or become apparent.

For example, in another embodiment, a UE may determine an assigned uplink (UL) reference signal channel comprising a UL reference signal sequence, resource element pattern, and time frequency location based in part on a number of UL reference signal sequences that have been assigned, as described previously. The UE may then transmit an UL reference signal using the assigned UL reference signal channel. The information indicating the number of UL reference signal sequences that have been assigned may be received from one or more transmission reception points (TRPs) via higher level signaling, for example. As discussed previously, the determination of the UL reference signal channel may also be based on a hyper cell ID associated with a hyper cell that includes at least one TRP serving the UE and/or UE-specific information such as the UE ID assigned to the UE.

Figure 6:
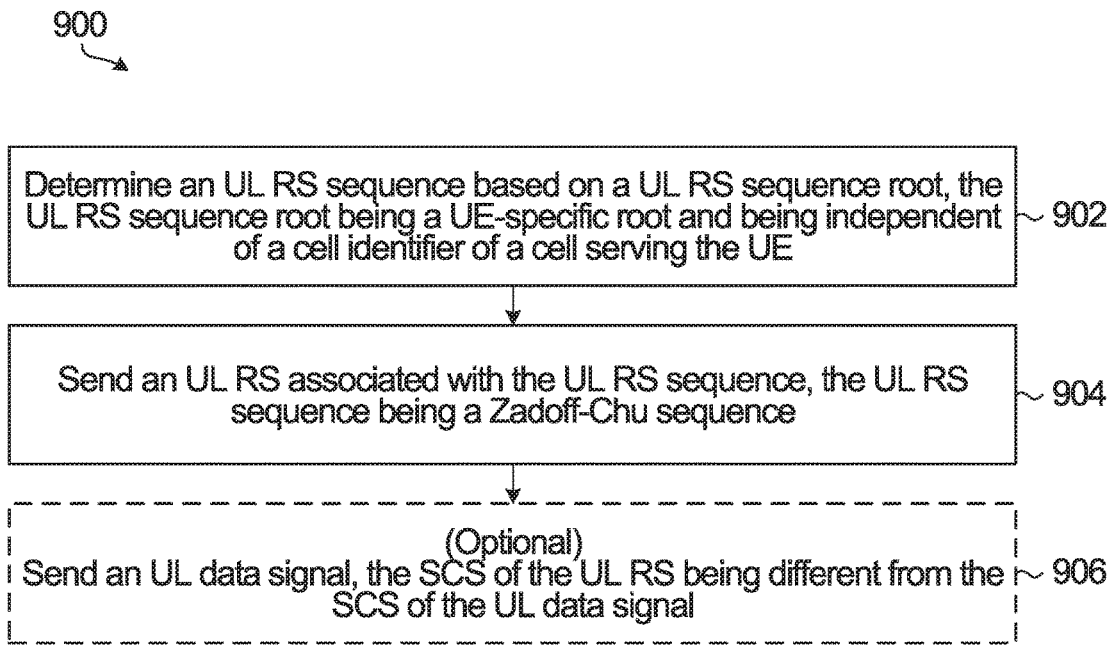
FIG. 6 is a flow diagram of example operations in a UE according to another embodiment of the present disclosure.

FIG. 6 illustrates a flow diagram of example operations 900 in a UE according to another example embodiment described herein.

In block 902, the UE determines an UL RS sequence based on a UL RS sequence root, the UL RS sequence root being a UE-specific root and being independent of a cell identifier of a cell serving the UE. In some embodiments, the UL RS sequence root is from a pool of UL RS sequence roots that includes more than 60 UL RS sequence roots. In some embodiments, the UL RS sequence may have low cross-correlation with a UL RS sequence for another UE.

In block 904, the UE sends an UL RS associated with the UL RS sequence, the UL RS sequence being a Zadoff-Chu sequence.

Optionally, in block 906 the UE sends an UL data signal, the SCS of the UL RS being different from the SCS of the UL data signal.

The example operations 900 are illustrative of an example embodiment. Various ways to perform the illustrated operations, as well as examples of other operations that may be performed, are described herein. Further variations may be or become apparent.

EXAMPLE EMBODIMENTS

The following provides a non-limiting list of example embodiments of the present disclosure:

Example Embodiment 1

A method comprising:
assigning, at a transmission reception point (TRP) in a wireless communication network:
 a first uplink (UL) reference signal (RS) sequence to a first user equipment (UE); and
 a second UL RS sequence to a second UE, the first and second UL RS sequences being non-orthogonal;
receiving, at the TRP:
 a first UL RS from the first UE, the first UL RS comprising the first UL RS sequence; and
 a second UL RS from the second UE, the second UL RS comprising the second UL RS sequence.

Example Embodiment 2

The method of Example embodiment 1, wherein the first UL RS is located in a first time-frequency location and the second UL RS is located in a second time-frequency location different from the first time-frequency location.

Example Embodiment 3

The method of Example embodiment 1, wherein the first and second UL RSs are both located in a first time-frequency location.

Example Embodiment 4

The method of any one of Example embodiments 1 to 3, wherein the first and second UL RS sequences are generated using first and second UL RS sequence roots, respectively, each root being based in part on a number of UL reference signal sequences that have been assigned.

Example Embodiment 5

The method of Example embodiment 4, wherein each root is based in part on a ratio of a) the number of UL RS sequences that have been assigned to b) a maximum number of cyclic shifts permissible for any one UL RS sequence.

Example Embodiment 6

The method of Example embodiment 4, wherein the first and second UL RS sequence roots are each based in part on a function $f_{UCS}$ according to:

$$f_{UCS} = l \times \left\lfloor \frac{n_{SRS}}{n_{SRS}^{cs,max}} \right\rfloor,$$

where $n_{SRS}$ is the number of UL RS sequences that have been assigned, $n_{SRS}^{cs,max}$ is the maximum number of cyclic shifts permissible for any one UL RS sequence, and l is an integer.

Example Embodiment 7

The method of Example embodiment 5 or 6, wherein the maximum number of cyclic shifts permissible for any one UL RS sequence is greater than 12.

Example Embodiment 8

The method of any one of Example embodiments 1 to 3, wherein the first and second UL RS sequences are generated using first and second UL RS sequence roots that are each based in part on a hyper cell identifier (ID) associated with a hyper cell that includes the TRP.

Example Embodiment 9

The method of any one of Example embodiments 4 to 8, wherein the first and second UL RS sequence roots are from a pool of UL RS sequence roots that includes more than 60 UL RS sequence roots.

Example Embodiment 10

The method of any one of Example embodiments 1 to 9, wherein at least one of the UL reference signals has an assigned bandwidth larger than 20 MHz.

Example Embodiment 11

The method of any one of Example embodiments 1 to 10, wherein at least one of the UL reference signals has a sub-carrier spacing (SCS) smaller than 15 kHz.

Example Embodiment 12

The method of any one of Example embodiments 1 to 10, wherein at least one of the UL reference signals has a sub-carrier spacing (SCS) larger than 15 kHz.

Example Embodiment 13

The method of any one of Example embodiments 1 to 12, wherein at least one of the UL reference signals has a sub-carrier spacing (SCS) that is different than the SCS in a time-frequency location used by an uplink data channel.

Example Embodiment 14

The method of Example embodiment 13, wherein there is a guard band between the UL reference signals and the time-frequency location used by the uplink data channel.

Example Embodiment 15

The method of any one of Example embodiments 1 to 14, further comprising:
  assigning, at the TRP, a third UL RS sequence to a third UE, the third UL RS sequence being orthogonal to the first UL RS sequence; and
  receiving, at the TRP, a third UL RS from the third UE, the third UL RS comprising the third UL RS sequence.

Example Embodiment 16

The method of Example embodiment 15, wherein the third UL RS sequence is a cyclic shift of the first UL RS sequence.

Example Embodiment 17

The method of any one of Example embodiments 1 to 16, wherein the first and second UL RS sequences have low cross-correlation.

Example Embodiment 18

The method of any one of Example embodiments 1 to 17, wherein the first and second UL RS sequences are Zadoff-Chu sequences.

Example Embodiment 19

The method of any one of Example embodiments 1 to 18, further comprising:
  performing uplink channel measurements based on the received UL RSs; and
  for each of at least one of the UEs, determining channel state information (CSI) and/or a channel quality indicator (CQI) based at least in part on the uplink channel measurement for the UE.

Example Embodiment 20

A transmission reception point (TRP) for wireless communication, the TRP comprising:
  a memory storage comprising instructions; and
  one or more processors in communication with the memory storage, wherein the one or more processors execute the instructions to:
  assign:
    a first uplink (UL) reference signal (RS) sequence to a first user equipment (UE); and
    a second UL RS sequence to a second UE, the first and second UL RS sequences being non-orthogonal; and
  receive:
    a first UL RS from the first UE, the first UL RS comprising the first UL RS sequence; and
    a second UL RS from the second UE, the second UL RS comprising the second UL RS sequence.

Example Embodiment 21

The TRP of Example embodiment 20, wherein the first UL RS is located in a first time-frequency location and the second UL RS is located in a second time-frequency location different from the first time-frequency location.

Example Embodiment 22

The TRP of Example embodiment 20, wherein the first and second UL RSs are both located in a first time-frequency location.

Example Embodiment 23

The TRP of any one of Example embodiments 20 to 22, wherein the first and second UL RS sequences are generated using first and second UL RS sequence roots, respectively, each root being based in part on a number of UL reference signal sequences that have been assigned.

Example Embodiment 24

The TRP of Example embodiment 23, wherein each root is based in part on a ratio of a) the number of UL RS sequences that have been assigned to b) a maximum number of cyclic shifts permissible for any one UL RS sequence.

Example Embodiment 25

The TRP of Example embodiment 23, wherein the first and second UL RS sequence roots are each based in part on a function $f_{UCS}$ according to:

$$f_{UCS} = l \times \left\lfloor \frac{n_{SRS}}{n_{SRS}^{cs,max}} \right\rfloor,$$

where $n_{SRS}$ is the number of UL RS sequences that have been assigned, $n_{SRS}^{cs,max}$ is the maximum number of cyclic shifts permissible for any one UL RS sequence, and l is an integer.

Example Embodiment 26

The TRP of Example embodiment 24 or 25, wherein the maximum number of cyclic shifts permissible for any one UL RS sequence is greater than 12.

Example Embodiment 27

The TRP of any one of Example embodiments 20 to 22, wherein the first and second UL RS sequences are generated using first and second UL RS sequence roots that are each based in part on a hyper cell identifier (ID) associated with a hyper cell that includes the TRP.

Example Embodiment 28

The TRP of any one of Example embodiments 23 to 27, wherein the first and second UL RS sequence roots are from a pool of UL RS sequence roots that includes more than 60 UL RS sequence roots.

Example Embodiment 29

The TRP of any one of Example embodiments 20 to 28, wherein at least one of the UL reference signals has an assigned bandwidth larger than 20 MHz.

Example Embodiment 30

The TRP of any one of Example embodiments 20 to 29, wherein at least one of the UL reference signals has a sub-carrier spacing (SCS) smaller than 15 kHz.

Example Embodiment 31

The TRP of any one of Example embodiments 20 to 29, wherein at least one of the UL reference signals has a sub-carrier spacing (SCS) larger than 15 kHz.

Example Embodiment 32

The TRP of any one of Example embodiments 20 to 31, wherein at least one of the UL reference signals has a sub-carrier spacing (SCS) that is different than the SCS in a time-frequency location used by an uplink data channel.

Example Embodiment 33

The TRP of Example embodiment 32, wherein there is a guard band between the UL reference signals and the time-frequency location used by the uplink data channel.

Example Embodiment 34

The TRP of any one of Example embodiments 20 to 33, wherein the one or more processors execute the instructions to:
assign a third UL RS sequence to a third UE, the third UL RS sequence being orthogonal to the first UL RS sequence; and
receive a third UL RS from the third UE, the third UL RS comprising the third UL RS sequence.

Example Embodiment 35

The TRP of Example embodiment 34, wherein the third UL RS sequence is a cyclic shift of the first UL RS sequence.

Example Embodiment 36

The TRP of any one of Example embodiments 20 to 35, wherein the first and second UL RS sequences have low cross-correlation.

Example Embodiment 37

The TRP of any one of Example embodiments 20 to 36, wherein the first and second UL RS sequences are Zadoff-Chu sequences.

Example Embodiment 38

The TRP of any one of Example embodiments 20 to 37, wherein the one or more processors execute the instructions to:
perform uplink channel measurements based on the received UL RSs; and
for each of at least one of the UEs, determine channel state information (CSI) and/or a channel quality indicator (CQI) based at least in part on the uplink channel measurement for the UE.

Example Embodiment 39

A method comprising:
for a first user equipment (UE) served by a group of transmission reception points (TRP) in a hyper cell, assigning a first uplink (UL) reference signal (RS) sequence to the first UE for UL RS transmission based in part on a hyper cell identifier (ID) of the hyper cell.

Example Embodiment 40

The method of Example embodiment 39, wherein the first UL RS sequence is generated using a first UL RS sequence root selected from a pool of UL RS sequence roots that includes more than 60 UL RS sequence roots.

Example Embodiment 41

The method of Example embodiment 39 or 40, further comprising:
for a second UE served by a group of TRPs in the hyper cell, assigning a second UL RS sequence to the second UE for UL RS transmission based in part on the hyper cell ID of the hyper cell.

Example Embodiment 42

The method of Example embodiment 41, wherein assigning the first and second UL RS sequences comprises assigning first and second UL RS sequences that are orthogonal if the first and second UEs are served by the same group of TRPs.

Example Embodiment 43

The method of Example embodiment 42, wherein assigning first and second UL RS sequences that are orthogonal comprises assigning first and second UL RS sequences that are different cyclic shifts of a sequence generated using the same UL RS sequence root.

Example Embodiment 44

The method of Example embodiment 41, wherein assigning the first and second UL RS sequences comprises assigning first and second UL RS sequences with low cross-correlation if the first and second UEs are served by different groups of TRPs.

Example Embodiment 45

The method of Example embodiment 44, wherein assigning first and second UL RS sequences with low cross-correlation comprises assigning first and second UL RS sequences generated using different UL RS sequence roots.

Example Embodiment 46

The method of Example embodiment 41, further comprising:
assigning a first resource element pattern to the first UE for UL RS transmission; and
assigning a second resource element pattern to the second UE for UL RS transmission,
wherein assigning the first and second UL RS sequences and the first and second resource element patterns comprises assigning first and second UL RS sequences that are orthogonal and/or assigning first and second resource element patterns that are orthogonal if the first and second UEs are served by the same group of TRPs.

Example Embodiment 47

A method that combines any two or more of the network/TRP methods according to the above Example embodiments.

Example Embodiment 48

A transmission reception point (TRP) for wireless communication, the TRP comprising:
a memory storage comprising instructions; and
one or more processors in communication with the memory storage, wherein the one or more processors execute the instructions to:
for a first user equipment (UE) served by a group of transmission reception points (TRP) in a hyper cell, assigning a first uplink (UL) reference signal (RS) sequence to the first UE for UL RS transmission based in part on a hyper cell identifier (ID) of the hyper cell.

Example Embodiment 49

The TRP of Example embodiment 48, wherein the first UL RS sequence is generated using a first UL RS sequence root selected from a pool of UL RS sequence roots that includes more than 60 UL RS sequence roots.

Example Embodiment 50

The TRP of Example embodiment 48 or 49, wherein the one or more processors execute the instructions to:
for a second UE served by a group of TRPs in the hyper cell, assign a second UL RS sequence to the second UE for UL RS transmission based in part on the hyper cell ID of the hyper cell.

Example Embodiment 51

The TRP of Example embodiment 50, wherein assigning the first and second UL RS sequences comprises assigning first and second UL RS sequences that are orthogonal if the first and second UEs are served by the same group of TRPs.

Example Embodiment 52

The TRP of Example embodiment 51, wherein assigning first and second UL RS sequences that are orthogonal comprises assigning first and second UL RS sequences that are different cyclic shifts of a sequence generated using the same UL RS sequence root.

Example Embodiment 53

The TRP of Example embodiment 50, wherein assigning the first and second UL RS sequences comprises assigning first and second UL RS sequences with low cross-correlation if the first and second UEs are served by different groups of TRPs.

Example Embodiment 54

The TRP of Example embodiment 53, wherein assigning first and second UL RS sequences with low cross-correlation comprises assigning first and second UL RS sequences generated using different UL RS sequence roots.

Example Embodiment 55

The TRP of Example embodiment 50, wherein the one or more processors execute the instructions to:
assign a first resource element pattern to the first UE for UL RS transmission; and
assign a second resource element pattern to the second UE for UL RS transmission,
wherein assigning the first and second UL RS sequences and the first and second resource element patterns comprises assigning first and second UL RS sequences that are orthogonal and/or assigning first and second resource element patterns that are orthogonal if the first and second UEs are served by the same group of TRPs.

Example Embodiment 56

A method in a user equipment (UE) comprising:
receiving a hyper cell identifier (ID) of a hyper cell that includes a group of transmission reception points (TRPs) serving the UE;
determining an uplink (UL) reference signal sequence based in part on the hyper cell ID; and
transmitting an UL reference signal comprising the UL reference signal sequence.

Example Embodiment 57

The method of Example embodiment 56, wherein determining an UL reference signal sequence, based in part on the hyper cell ID, comprises determining an UL reference signal sequence root based in part on the hyper cell ID and deriving the US reference signal sequence based in part on the UL reference signal sequence root.

Example Embodiment 58

The method of Example embodiment 57, wherein determining the UL reference signal sequence root is further based in part on a number of UL reference signal sequences that have been assigned.

Example Embodiment 59

The method of Example embodiment 58, wherein determining the UL reference signal sequence root based in further part on the number of UL reference signal sequences that have been assigned comprises determining the UL reference signal sequence root based in further part on a ratio of a) the number of UL reference signal sequences that have been assigned to b) a maximum number of cyclic shifts permissible for any one UL RS sequence.

Example Embodiment 60

The method of Example embodiment 58 or 59, wherein the maximum number of cyclic shifts permissible for any one UL RS sequence is greater than 12.

Example Embodiment 61

The method of any one of Example embodiments 57 to 60, wherein the UL reference signal sequence roots is from a pool of UL reference signal sequence roots that includes more than 60 UL reference signal sequence roots.

Example Embodiment 62

The method of any one of Example embodiments 56 to 61, wherein transmitting the UL reference signal comprises transmitting the UL reference signal in a time-frequency location having an assigned bandwidth larger than 20 MHz.

Example Embodiment 63

The method of any one of Example embodiments 56 to 62, wherein the UL reference signal has a sub-carrier spacing (SCS) smaller than 15 kHz.

Example Embodiment 64

The method of any one of Example embodiments 56 to 62, wherein the UL reference signal has a sub-carrier spacing (SCS) larger than 15 kHz.

Example Embodiment 65

The method of any one of Example embodiments 56 to 62, further comprising transmitting an UL data signal on an UL data channel, wherein the UL reference signal has a sub-carrier spacing (SCS) that is different than the SCS of the uplink data signal.

Example Embodiment 66

The method of Example embodiment 65, wherein transmitting the UL reference signal and the uplink data signal comprises transmitting the UL reference signal in a first time-frequency location and transmitting the UL data signal in a second time-frequency location, with a guard band between the first and second time-frequency locations.

Example Embodiment 67

A user equipment (UE) comprising:
a memory storage comprising instructions; and
one or more processors in communication with the memory storage, wherein the one or more processors execute the instructions to:
receive a hyper cell identifier (ID) of a hyper cell that includes a group of transmission reception points (TRPs) serving the UE;
determine an uplink (UL) reference signal sequence based in part on the hyper cell ID; and
transmit an UL reference signal comprising the UL reference signal sequence.

Example Embodiment 68

The UE of Example embodiment 67, wherein determining an UL reference signal sequence, based in part on the hyper cell ID, comprises determining an UL reference signal sequence root based in part on the hyper cell ID and deriving the US reference signal sequence based in part on the UL reference signal sequence root.

Example Embodiment 69

The UE of Example embodiment 68, wherein determining the UL reference signal sequence root is further based in part on a number of UL reference signal sequences that have been assigned.

Example Embodiment 70

The UE of Example embodiment 69, wherein determining the UL reference signal sequence root based in further part on the number of UL reference signal sequences that have been assigned comprises determining the UL reference signal sequence root based in further part on a ratio of a) the number of UL reference signal sequences that have been assigned to b) a maximum number of cyclic shifts permissible for any one UL RS sequence.

Example Embodiment 71

The UE of Example embodiment 69 or 70, wherein the maximum number of cyclic shifts permissible for any one UL RS sequence is greater than 12.

Example Embodiment 72

The UE of any one of Example embodiments 68 to 71, wherein the UL reference signal sequence roots is from a pool of UL reference signal sequence roots that includes more than 60 UL reference signal sequence roots.

Example Embodiment 73

The UE of any one of Example embodiments 67 to 72, wherein transmitting the UL reference signal comprises transmitting the UL reference signal in a time-frequency location having an assigned bandwidth larger than 20 MHz.

Example Embodiment 74

The UE of any one of Example embodiments 67 to 73, wherein the UL reference signal has a sub-carrier spacing (SCS) smaller than 15 kHz.

Example Embodiment 75

The UE of any one of Example embodiments 67 to 73, wherein the UL reference signal has a sub-carrier spacing (SCS) larger than 15 kHz.

Example Embodiment 76

The UE of any one of Example embodiments 67 to 73, wherein the one or more processors execute the instructions to transmit an UL data signal on an UL data channel, wherein the UL reference signal has a sub-carrier spacing (SCS) that is different than the SCS of the uplink data signal.

Example Embodiment 77

The UE of Example embodiment 76, wherein transmitting the UL reference signal and the uplink data signal comprises transmitting the UL reference signal in a first time-frequency location and transmitting the UL data signal in a second time-frequency location, with a guard band between the first and second time-frequency locations.

Example Embodiment 78

A method in a user equipment (UE) comprising:
determining an assigned uplink (UL) reference signal sequence based in part on a number of UL reference signal sequences that have been assigned;
transmitting an UL reference signal using the assigned UL reference signal sequence.

Example Embodiment 79

The method of Example embodiment 78, further comprising receiving, via higher level signaling from one or more transmission reception points (TRPs), information indicating the number of UL reference signal sequences that have been assigned.

Example Embodiment 80

The method of Example embodiment 78, wherein determining the assigned UL reference signal sequence comprises determining an UL reference signal sequence root based in part on a function $f_{UCS}$ according to:

$$f_{UCS} = l \times \left\lfloor \frac{n_{SRS}}{n_{SRS}^{cs,max}} \right\rfloor,$$

where $n_{SRS}$ is a number of UL reference signal sequences that have been assigned, $n_{SRS}^{cs,max}$ is a maximum number of cyclic shifts permissible for any one UL reference signal sequence, and l is an integer.

Example Embodiment 81

The method of Example embodiment 80, wherein the maximum number of cyclic shifts permissible for any one UL RS sequence is greater than 12.

Example Embodiment 82

The method of any one of Example embodiments 78 to 81, wherein determining an assigned UL reference signal sequence, resource element pattern, and time-frequency location based in part on a number of UL reference signal sequences that have been assigned comprises determining the assigned UL reference signal sequence, resource element pattern, and time-frequency location based in further part on a hyper cell identifier associated with a hyper cell that includes at least one TRP serving the UE.

Example Embodiment 83

A method that combines any two or more of the UE methods according to the above Example embodiments.

Example Embodiment 84

A user equipment (UE) comprising:
a memory storage comprising instructions; and
one or more processors in communication with the memory storage, wherein the one or more processors execute the instructions to:
determine an assigned uplink (UL) reference signal sequence based in part on a number of UL reference signal sequences that have been assigned;
transmit an UL reference signal using the assigned UL reference signal sequence.

Example Embodiment 85

The UE of Example embodiment 84, wherein the one or more processors execute the instructions to receive, via higher level signaling from one or more transmission reception points (TRPs), information indicating the number of UL reference signal sequences that have been assigned.

Example Embodiment 86

The UE of Example embodiment 84, wherein determining the assigned UL reference signal sequence comprises determining an UL reference signal sequence root based in part on a function $f_{UCS}$ according to:

$$f_{UCS} = l \times \left\lfloor \frac{n_{SRS}}{n_{SRS}^{cs,max}} \right\rfloor,$$

where $n_{SRS}$ is a number of UL reference signal sequences that have been assigned, $n_{SRS}^{cs,max}$ is a maximum number of cyclic shifts permissible for any one UL reference signal sequence, and l is an integer.

Example Embodiment 87

The UE of Example embodiment 86, wherein the maximum number of cyclic shifts permissible for any one UL RS sequence is greater than 12.

Example Embodiment 88

The UE of any one of Example embodiments 84 to 87, wherein determining an assigned UL reference signal sequence, resource element pattern, and time-frequency location based in part on a number of UL reference signal sequences that have been assigned comprises determining the assigned UL reference signal sequence, resource element pattern, and time-frequency location based in further part on a hyper cell identifier associated with a hyper cell that includes at least one TRP serving the UE.

Example Embodiment 89

A TRP or group of TRPs configured to implement the method of any one of Example embodiments 1 to 19 or 39 to 47.

Example Embodiment 90

A UE configured to implement the method of any one of Example embodiments 56 to 66 or 78 to 83.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A communication method comprising:
receiving, at a transmission reception point (TRP) in a wireless communication network:
a first uplink (UL) reference signal (RS) associated with a first UL RS sequence from a first user equipment (UE); and
a second UL RS associated with a second UL RS sequence from a second UE, the first and second UL RS sequences being non-orthogonal,
wherein the first and second UL RS sequences are generated using first and second UL RS sequence roots that are each based in part on a hyper cell identifier (ID) associated with a hyper cell that includes the TRP.

2. The method of claim 1, wherein the first UL RS is located in a first time-frequency location and the second UL RS is located in a second time-frequency location different from the first time-frequency location.

3. The method of claim 1, wherein at least one of the UL reference signals has a sub-carrier spacing (SCS) that is different than the SCS in a time-frequency location used by an uplink data channel.

4. The method of claim 1, wherein the first and second UL RS sequences have low cross-correlation.

5. A communication method comprising:
receiving, at a transmission reception point (TRP) in a wireless communication network:
a first uplink (UL) reference signal (RS) associated with a first UL RS sequence from a first user equipment (UE); and
a second UL RS associated with a second UL RS sequence from a second UE, the first and second UL RS sequences being non-orthogonal,
wherein the first and second UL RS sequences are generated using first and second UL RS sequence roots, respectively, each root being based in part on a number of UL reference signal sequences that have been assigned.

6. The method of claim 5, wherein the first and second UL RS sequence roots are each based in part on a function $f_{UCS}$ according to:

$$f_{UCS} = l \times \left\lfloor \frac{n_{SRS}}{n_{SRS}^{cs,max}} \right\rfloor,$$

where $n_{SRS}$ is the number of UL RS sequences that have been assigned, $n_{SRS}^{cs,max}$ is the maximum number of cyclic shifts permissible for any one UL RS sequence, and l is an integer.

7. The method of claim 5, wherein the first and second UL RS sequence roots are from a pool of UL RS sequence roots that includes more than 60 UL RS sequence roots.

8. A transmission reception point (TRP) for wireless communication, the TRP comprising:
a memory storage comprising instructions; and
one or more processors in communication with the memory storage, wherein the one or more processors execute the instructions to:
receive a first uplink (UL) reference signal (RS) associated with a first UL RS sequence from a first user equipment (UE); and
receive a second UL RS associated with a second UL RS sequence from a second UE, the first and second UL RS sequences being non-orthogonal, wherein the first and second UL RS sequences are generated using first and second UL RS sequence roots that are each based in part on a hyper cell identifier (ID) associated with a hyper cell that includes the TRP.

9. The TRP of claim 8, wherein the first UL RS is located in a first time-frequency location and the second UL RS is located in a second time-frequency location different from the first time-frequency location.

10. The TRP of claim 8, wherein at least one of the UL reference signals has a sub-carrier spacing (SCS) that is different than the SCS in a time-frequency location used by an uplink data channel.

11. The TRP of claim 8, wherein the first and second UL RS sequences have low cross-correlation.

12. A transmission reception point (TRP) for wireless communication, the TRP comprising:
a memory storage comprising instructions; and
one or more processors in communication with the memory storage, wherein the one or more processors execute the instructions to:
receive a first uplink (UL) reference signal (RS) associated with a first UL RS sequence from a first user equipment (UE); and
receive a second UL RS associated with a second UL RS sequence from a second UE, the first and second UL RS sequences being non-orthogonal, wherein the first and second UL RS sequences are generated using first and second UL RS sequence roots, respectively, each root being based in part on a number of UL reference signal sequences that have been assigned.

13. The TRP of claim 12, wherein the first and second UL RS sequence roots are each based in part on a function $f_{UCS}$ according to:

$$f_{UCS} = l \times \left\lfloor \frac{n_{SRS}}{n_{SRS}^{cs,max}} \right\rfloor,$$

where $n_{SRS}$ is the number of UL RS sequences that have been assigned, $n_{SRS}^{cs,max}$ is the maximum number of cyclic shifts permissible for any one UL RS sequence, and l is an integer.

14. The TRP of claim 12, wherein the first and second UL RS sequence roots are from a pool of UL RS sequence roots that includes more than 60 UL RS sequence roots.

15. A communication method comprising:
determining, by a user equipment (UE), an uplink (UL) reference signal (RS) sequence based on a UL RS sequence root, the UL RS sequence root being a UE-specific root and being independent of a cell identifier of a cell serving the UE; and
sending, by the UE, an UL RS associated with the UL RS sequence, the UL RS sequence being a Zadoff-Chu sequence.

16. The method of claim 15, wherein the UL RS sequence root is from a pool of UL RS sequence roots that includes more than 60 UL RS sequence roots.

17. The method of claim 15, wherein the UL RS sequence has low cross-correlation with a UL RS sequence for another UE.

18. The method of claim 15, further comprising:
sending, by the UE, an UL data signal, the sub-carrier spacing (SCS) of the UL RS being different from the SCS of the UL data signal.

19. A user equipment (UE) comprising:
a memory storage comprising instructions; and
one or more processors in communication with the memory storage, wherein the one or more processors execute the instructions to:
determine an uplink (UL) reference signal (RS) sequence based on a UL RS sequence root, the UL RS sequence root being a UE-specific root and being independent of a cell identifier of a cell serving the UE; and
send an UL RS associated with the UL RS sequence, the UL RS sequence being a Zadoff-Chu sequence.

20. The UE of claim 19, wherein the UL RS sequence root is from a pool of UL RS sequence roots that includes more than 60 UL RS sequence roots.

21. The UE of claim 19, wherein the UL RS sequence has low cross-correlation with a UL RS sequence for another UE.

22. The UE of claim 19, wherein the one or more processors execute the instructions to:
send an UL data signal, the sub-carrier spacing (SCS) of the UL RS being different from the SCS of the UL data signal.

23. A communication method comprising:
receiving, at a transmission reception point (TRP) in a wireless communication network:
a first uplink (UL) reference signal (RS) associated with a first UL RS sequence from a first user equipment (UE); and
a second UL RS associated with a second UL RS sequence from a second UE, the first and second UL RS sequences being non-orthogonal, the first UL RS being located in a first time-frequency location and the second UL RS being located in a second time-frequency location that at least partially overlaps the first time-frequency location;
performing UL channel measurements based on the received first and second UL RSs; and
for each of the first UE and the second UE, determining at least one channel characteristic based at least in part on the uplink channel measurement for the UE.

24. The method of claim 23, wherein determining at least one channel characteristic comprises determining at least one of channel state information (CSI) and channel quality indicator (CQI).

25. The method of claim 23, wherein the first and second UL RS sequences are generated using first and second UL RS sequence roots, respectively, from a pool of UL RS sequence roots that includes more than 60 UL RS sequence roots.

26. A transmission reception point (TRP) for wireless communication, the TRP comprising:
a memory storage comprising instructions; and
one or more processors in communication with the memory storage, wherein the one or more processors execute the instructions to:
perform UL channel measurements based on a first uplink (UL) reference signal (RS) associated with a first UL RS sequence from a first user equipment (UE) and a second UL RS associated with a second UL RS sequence from a second UE, the first and second UL RS sequences being non-orthogonal, the first UL RS being located in a first time-frequency location and the second UL RS being located in a second time-frequency location that at least partially overlaps the first time-frequency location; and for each of the first UE and the second UE, determine at least one channel characteristic based at least in part on the uplink channel measurement for the UE.

27. The TRP of claim 26, wherein determining at least one channel characteristic comprises determining at least one of channel state information (CSI) and channel quality indicator (CQI).

28. The TRP of claim 26, wherein the first and second UL RS sequence roots are from a pool of UL RS sequence roots that includes more than 60 UL RS sequence roots.

* * * * *